(12) United States Patent
Baiden

(10) Patent No.: US 10,539,956 B2
(45) Date of Patent: Jan. 21, 2020

(54) SUBSURFACE ROBOTIC MAPPING SYSTEM AND METHOD

(71) Applicant: Penguin Automated Systems Inc., Naughton (CA)

(72) Inventor: Gregory Baiden, Lively (CA)

(73) Assignee: Penguin Automated Systems Inc., Naughton (CA)

(*) Notice: Subject to any disclaimer, the term of this patent is extended or adjusted under 35 U.S.C. 154(b) by 195 days.

(21) Appl. No.: 15/666,703

(22) Filed: Aug. 2, 2017

(65) Prior Publication Data

US 2018/0039263 A1 Feb. 8, 2018

Related U.S. Application Data

(60) Provisional application No. 62/370,103, filed on Aug. 2, 2016.

(51) Int. Cl.
| | |
|---|---|
| *G05B 19/04* | (2006.01) |
| *G05B 19/18* | (2006.01) |
| *G05D 1/00* | (2006.01) |
| *G01C 21/12* | (2006.01) |
| *G05D 1/02* | (2006.01) |

(52) U.S. Cl.
CPC ........... *G05D 1/0022* (2013.01); *G01C 21/12* (2013.01); *G05D 1/028* (2013.01); *G05D 2201/0207* (2013.01); *Y10S 901/01* (2013.01); *Y10S 901/47* (2013.01)

(58) Field of Classification Search
CPC ...... G01C 11/00; G01C 15/002; G01C 21/12; G05D 1/0022; G05D 1/028; G05D 2201/0207; Y10S 901/01; Y10S 901/47
See application file for complete search history.

(56) References Cited

U.S. PATENT DOCUMENTS

| | | | | |
|---|---|---|---|---|
| 2005/0219114 A1* | 10/2005 | Kawabe | ................... | G01S 1/70 342/47 |
| 2006/0074525 A1* | 4/2006 | Close | .................... | B25J 9/1617 700/245 |
| 2007/0156286 A1* | 7/2007 | Yamauchi | ........... | G05D 1/0038 700/245 |
| 2012/0013453 A1* | 1/2012 | Wyne | .................... | B60Q 1/525 340/425.5 |
| 2012/0173018 A1* | 7/2012 | Allen | .................. | G05D 1/0248 700/245 |
| 2014/0343728 A1* | 11/2014 | Jun | ...................... | B62D 57/032 700/259 |

* cited by examiner

*Primary Examiner* — Harry Y Oh
(74) *Attorney, Agent, or Firm* — DLA Piper LLP (US)

(57) ABSTRACT

A robotic mapping system for charting or mapping a path through an underground cavity, and/or mapping a surface of the underground cavity. The robotic mapping system may comprise a mobile control center located on the surface in wireless communications with one or more mapping robots located within the underground cavity. The mapping robots may be controlled by way of an avionics navigation system.

6 Claims, 14 Drawing Sheets

SUBSURFACE ROBOTIC MAPPING SYSTEM AND METHOD

TECHNICAL FIELD

This disclosure relates to subsurface mapping systems. In particular, this invention relates to a mapping system for real-time mapping of a path and/or surface in a subsurface cavity, such as a tunnel, and employing subsurface avionics for navigation purposes.

BACKGROUND

In environments that are unsuitable or hostile for humans, robots are particularly suited to perform tasks that would otherwise be performed by humans. An example of such an inhospitable environment that would benefit from robotics is subsurface mapping, such as the mapping of a tunnel or cavity underground.

A specific application of subsurface mapping is the charting and mapping of tunnels such as sewer tunnels. In such subsurface environments, ventilation is poor and the environment may be partially or fully flooded with water and/or liquid waste. As a result, personnel entry is either forbidden, or requires the use of specialized ventilators.

Many regions are faced with trying to accommodate current, as well as old and dis-used, tunnel systems. It would be advantageous to use a robotic system for charting and/or mapping a subsurface cavity. It would also be advantageous to control subsurface robots in the system with a navigation system that employs avionics.

Navigation systems for the operation and geo-positioning of aircraft, watercraft and land-based vehicles are well known in the art. In general, many navigation systems include one or more subsystems that are integrated to provide the most accurate positioning possible. Often, inertial navigation systems are used with one or more sensors to calculate the position, orientation and velocity as a moving object as it travels. However, subsurface navigation presents challenges that are not encountered with traditional surface (land or water) or aerial navigation systems due to the inherent restrictions on line-of-sight communication in the subsurface and the limitations on data transmission through the subsurface environment.

Inertial navigation systems use local measurements from on-board sensors over time and certain algorithms to produce a best estimate of position as an object moves from an initial position. Sensors known in the art as "dead-reckoning" sensors measure acceleration and angular velocity from which integrative functions produce a distance and vector relative to an initial reference coordinate position. A known problem with inertial navigation systems is the deterioration of accuracy over time due to the accumulation of unbounded errors with each measurement.

To compensate for these unbounded errors, many navigation systems for surface or aerial applications augment the inertial system with a complementary system, such as a positioning system, that aids in reducing the effect of accumulating measurement errors. For example, Global Positioning Systems (GPS) are often used in commercial airplane avionics to periodically update and correct the inertial system with external position measurements.

While inertial navigation systems have been used for subsurface applications, traditional GPS has not been used to compensate for the problems associated with unbounded errors in the subsurface data transmissions given that the ability to obtain an accurate geographical position using GPS requires triangulation of signals from at least three satellites by line-of-sight transmission from each satellite to the GPS receiver. As a result, inertial systems have found limited application in the subsurface and are known to have limited accuracy that degrades as the distance from the initial reference point increases spatially and temporally.

It would be advantageous to provide a subsurface avionics system that includes an inertial navigation system or some other means of navigation that can be supplemented with a means of external reference for accurate real-time positional re-calibration of the inertial navigation system.

BRIEF DESCRIPTION OF THE DRAWINGS

In drawings which illustrate by way of example only a preferred embodiment of the disclosure.

DETAILED DESCRIPTION

In an embodiment, a robotic subsurface mapping system is provided that may comprise a mobile control center for location on the surface near an access shaft to the subsurface to be mapped; a support located proximate to the access shaft, for supporting a tether; the tether affixed to the support and affixed to at least one robot, the tether selected to provide physical restraint of the at least one robot; the at least one robot comprising: at least sensor for generating scanning data for detecting the subsurface in relation to the at least one robot; a geospatial positioning system for continuously generating geospatial data for determining the geospatial position of the at least one robot; a controller for collecting and storing the geospatial data and the scanning data associated with timing data; a wireless communications device for transmitting the collected geospatial data, the scanning data and the associated timing data to communicate the geospatial data, the scanning data and the associated timing data to the mobile control center.

The robotic mapping system is capable of charting or mapping a path through an underground cavity, and/or mapping a surface of the underground cavity. The application is described in relation to sewer tunnels, though the surfaces of other subsurface cavities may similarly be mapped. The condition of the subsurface cavity is often unknown from the surface, and can change, with the robots potentially operating in a dry, partially submerged, and fully submerged environment.

Figure 10:
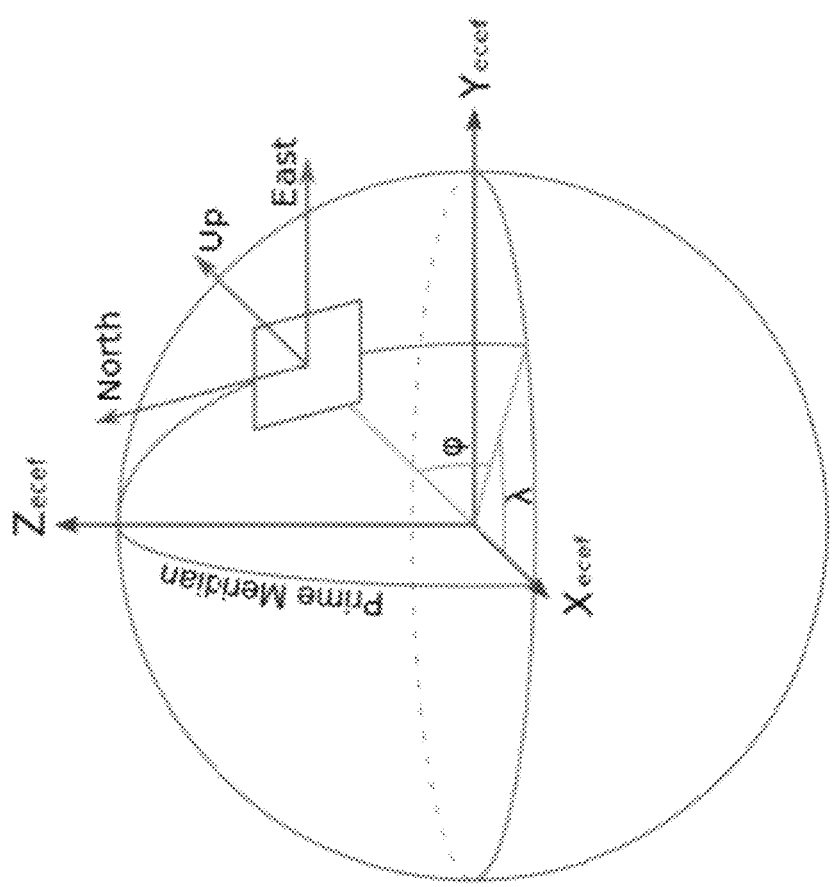
FIG. 10 is an exemplary diagram of a typical XYZ reference frame.

The mapping robots may also be teleoperated. The present application also provides a subsurface avionics system (SAS), preferred embodiment of which is illustrated in FIG. 10, and a subsurface avionics method, which is adaptable to virtually any subsurface environment or any fluid mass and is particularly suitable for use in subsurface engineering, subsurface mining and underwater mining environments. The system and method of the disclosure will be described in the context of subsurface engineering, but it has applications in other environments and the description is not intended to be limiting in this regard. For instance, without limitation, the system and method of the disclosure also has application as a positioning system for humans (which can also be 'vehicles' for transporting the system) and assets in subsurface environments, which may include subterranean, submarine, or subglacial environments (both terrestrial and extra-terrestrial), such as, without limitation, within lakes, ponds, oceans, seas, ice bodies, pipes, sewers, tunnels, mine shafts, cavities, and below surface of the moon or other non-earth bodies.

Figure 1:
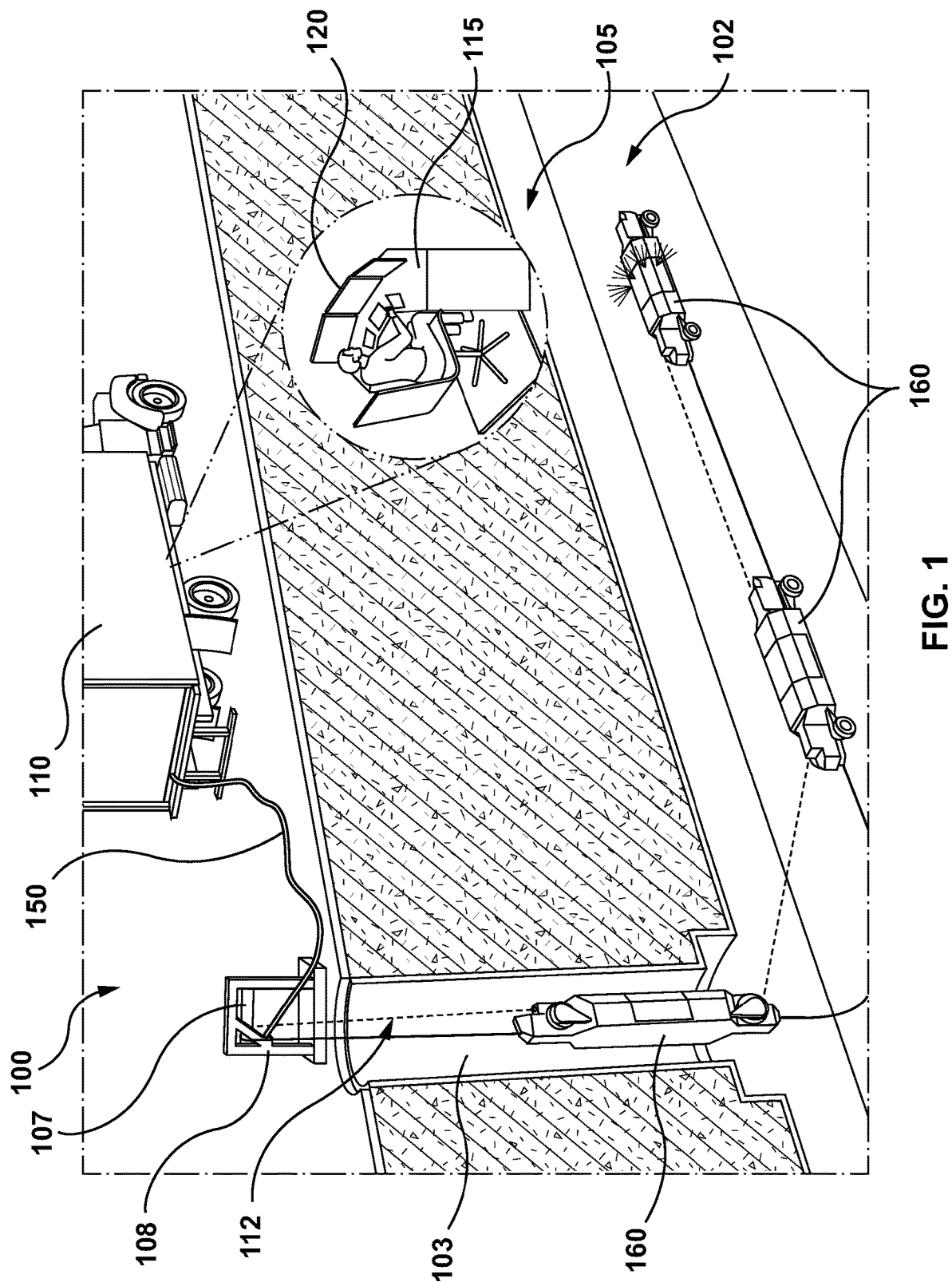
FIG. 1 is an isometric cutaway view of an embodiment of a robotic mapping system.

Referring to FIG. 1, one embodiment of a telerobotic mapping system 100 is illustrated. In the illustration a surface 105 of a subsurface cavity 102, such as a sewer tunnel, is being mapped by the robotic mapping system 100. A mobile control center 110 is located proximate to an access shaft 103. The mobile control center may comprise a teleoperation console 115 that provides information to an operator on one or more view screens 120.

The mobile control center 110 is in communication via communication link 112 with a wireless relay 107 situated to communicate wirelessly to a teleoperated mapping telerobot 160 located in the access shaft 103. In an embodiment, the wireless relay 107 may either be located at a base of the access shaft 103 in the subsurface cavity 102, or situated to communicate with a secondary relay located in the subsurface cavity 102, to communicate directly with the mapping telerobot(s) 160 in the subsurface cavity 102.

The telerobots 160 may each be connected to one another, and to a support 108 by a physical tether 150, such as an aircraft cable. In an aspect, each robot 160 may be connected to an end of a separate tether 160 in daisy chain fashion. In an alternate embodiment, a single continuous tether 150 may be used, and the robots 160 attached at locations along the tether 150.

In an embodiment of the robotic mapping system 100, the tether 150 is neither a communications nor a power cable, but only a physical tether. The purpose of the tether 150 being to provide a means to withdraw the telerobots 160 from the subsurface cavity 160, and to restrain them within the subsurface cavity 102 in case of flood or drop off. The use of tether 150 that is only a physical tether allows for flexible, relatively lightweight tether that may be fed deep into a subsurface cavity 102, and may be conveyed by the telerobots 160 if necessary along the ground of the cavity 102. The telerobots 160 communicate through the subsurface cavity 102 by wireless communication between robots 160. Accordingly, the series of telerobots 160 act as a relay to convey communication between the lead robot 160 and the mobile control center 110.

Figure 2:
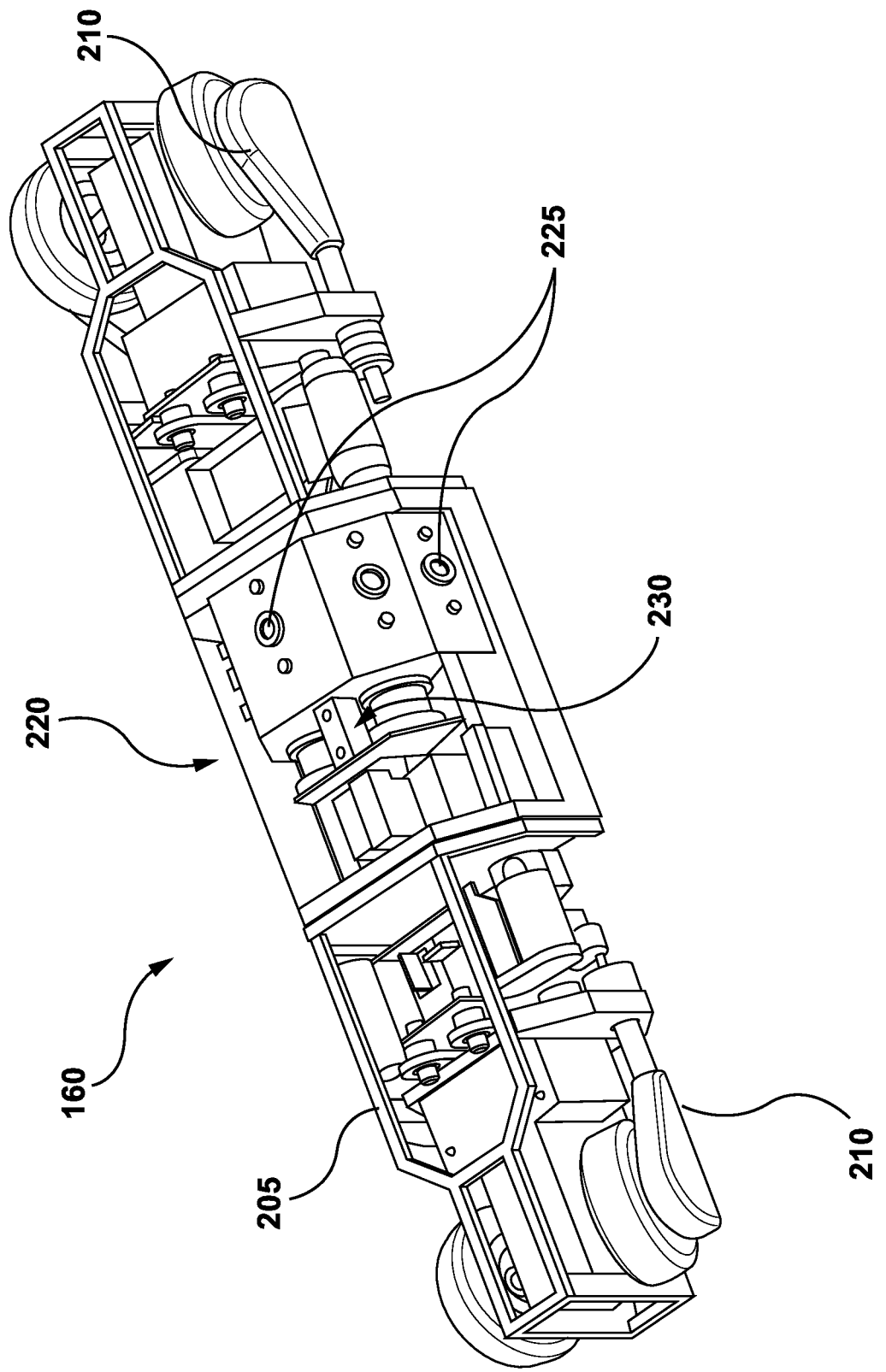
FIG. 2 shows exemplary perspective views of an embodiment of a mapping telerobot.

One embodiment of a telerobot 160 is illustrated in FIG. 2. The telerobot 160 shown in FIG. 2, which may be the lead telerobot 160 in a daisy chain of such robots, comprises a sensor package for mapping at least one surface 105 of the subsurface cavity 102.

Referring to FIG. 2, the telerobot 200 may comprise a chassis 205 supporting opposed drive units 210 separated by a payload. The payload may be, for example, a sensor package 220 (as illustrated in the figure) or it may be a communications module that allows for data processing and communications relay, or it may be any combination thereof. The drive units 210 are operative to propel the robot 160 when in a dry or partially submerged environment. The payload may further contain a battery to power the telerbobot 160.

The drive units may further contain an ethernet switch, radio and antenna, a light, a video encoder, a gas nipple, fuse, charging plug and on/off switch, all of which are components known to the skilled person.

A processor may be mounted in the payload in a shock and impact resistant casing that allows for thermal dissipation of heat from the processor. Further, as subsurface environments may be hazardous, the telerobot 160 itself is built to be resistant to the shock of explosions, and provides no ignition source to cause explosions in the presence of explosive gases in mine shafts or any flammable liquids.

In one embodiment, the sensor package 220 may comprise a plurality of sensors. In the embodiment of FIG. 2, the sensor package 220 comprises a plurality of Infrared cameras 225, a laser scanner 230. In one embodiment, the telerobot 160 may further comprise a thermal imaging camera, and/or sonar or radar sensors (not shown).

The telerobot 160 further includes a geospatial positioning system, such as by using sensitive gyroscopes and/or accelerometers, and a controller and memory for collecting and storing the geospatial positioning data, along with the imaging and scanning data. In an aspect, the controller may further comprise a clock for generating timing data that may be used to associate the geospatial data with the imaging and scanning data.

While it may be preferred to communicate the data wirelessly to the mobile control center 110 to ensure capture of the data, it is also preferred to maintain a local copy of the data on the telerobot 160 in case wireless communications are not possible, to buffer in case of slow communication rates, and to provide a back-up copy in case the wireless communication is otherwise lost. Wireless communication of the data is preferred as the subsurface environment is dangerous, and it is generally advantageous to relay the captured information to the surface as soon as practically possible in case of loss of equipment in the subsurface cavity 102.

In operation, the telerobot 160 continuously captures geospatial data, imaging, and scanning data, and stores it in association with corresponding timing data. In an aspect the stored data may further be transmitted by wireless communication through the subsurface cavity 102 via a series of telerobots 160 to reach the relay 107 at the surface, and be conveyed to the mobile control center 110.

Testing of the telerobotic mapping system 100 was completed in mine and a mine map data set was compiled. The data set could be accurately measured and used for several mine applications such as equipment fit, ventilation surface roughness determination, mine road quality and tunnel construction quality.

Figure 3:
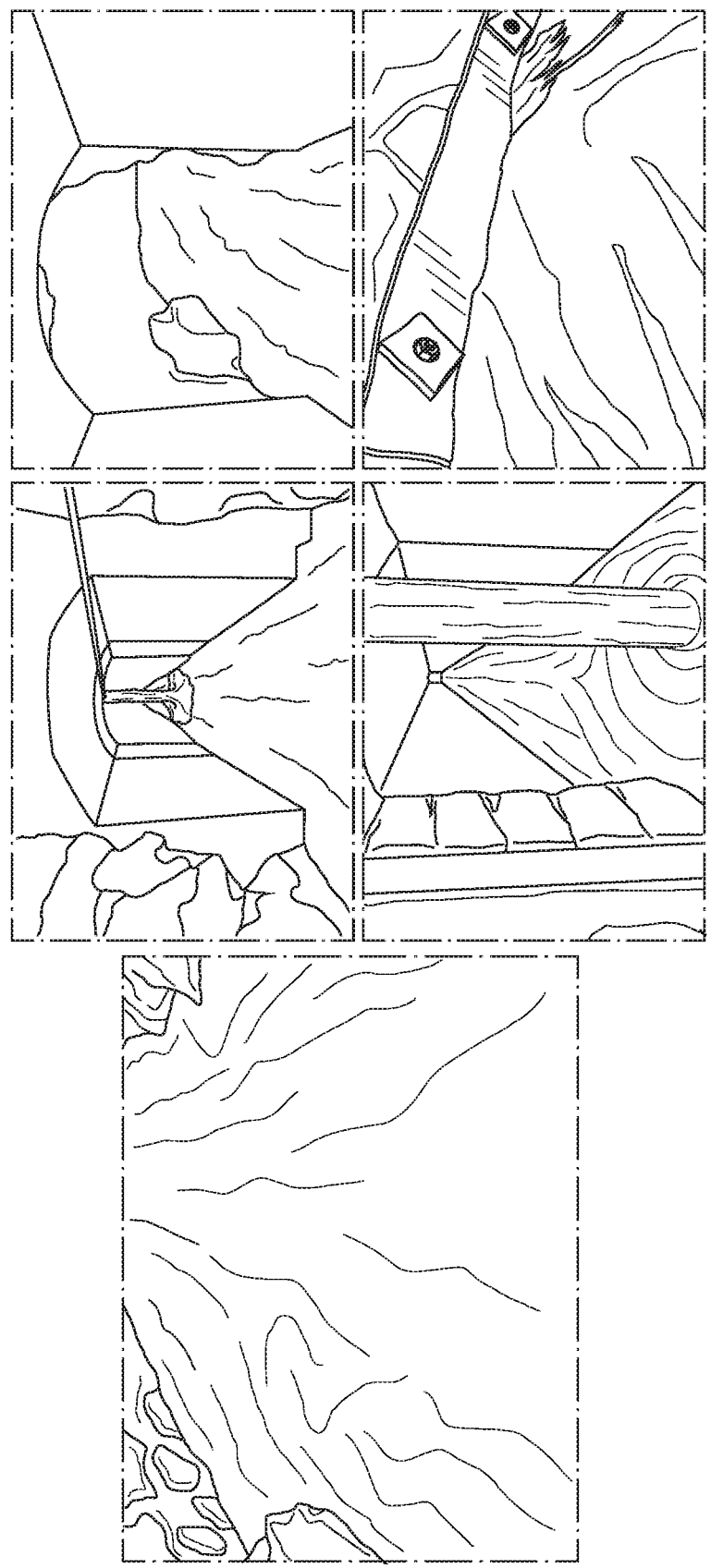
FIG. 3 provides exemplary still images of underground sewer conditions.

FIG. 3 provides exemplary photos of underground sewer conditions taken by a telerobot 160 of the present disclosure during testing.

Figure 4:
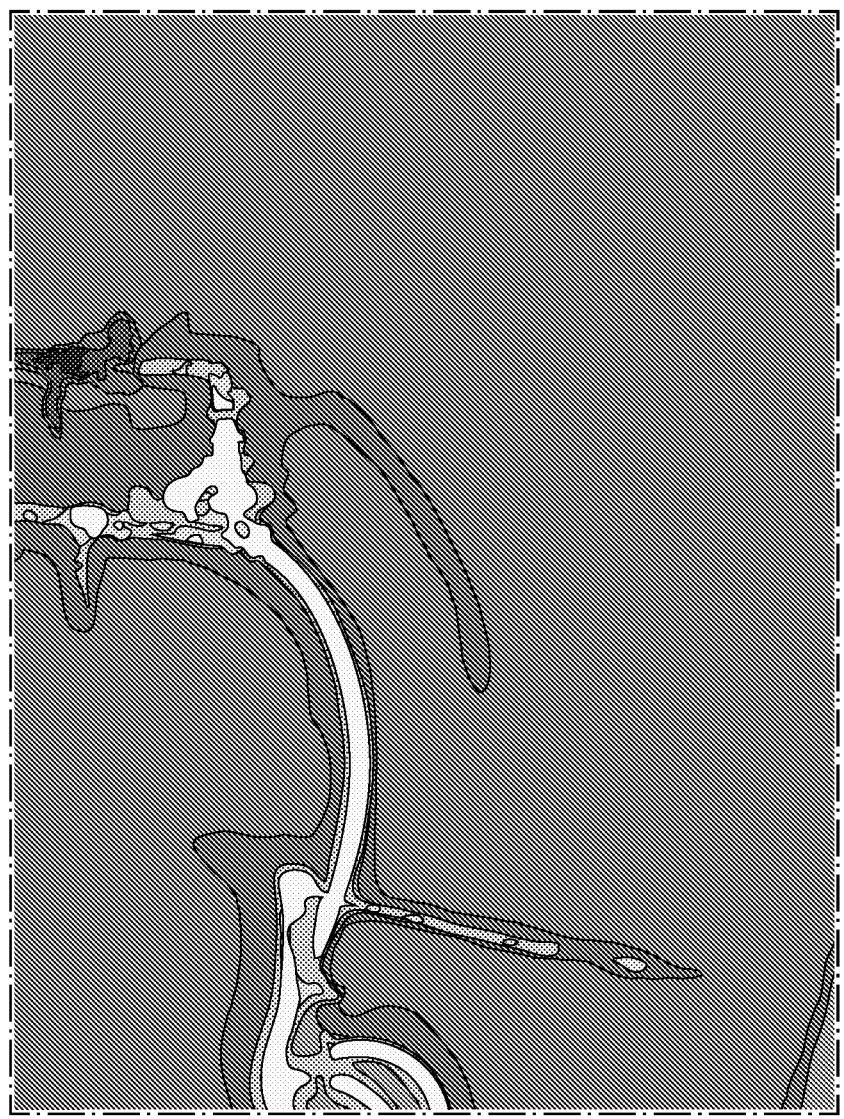
FIG. 4 provides exemplary thermal images of a sewer.
Figure 4:
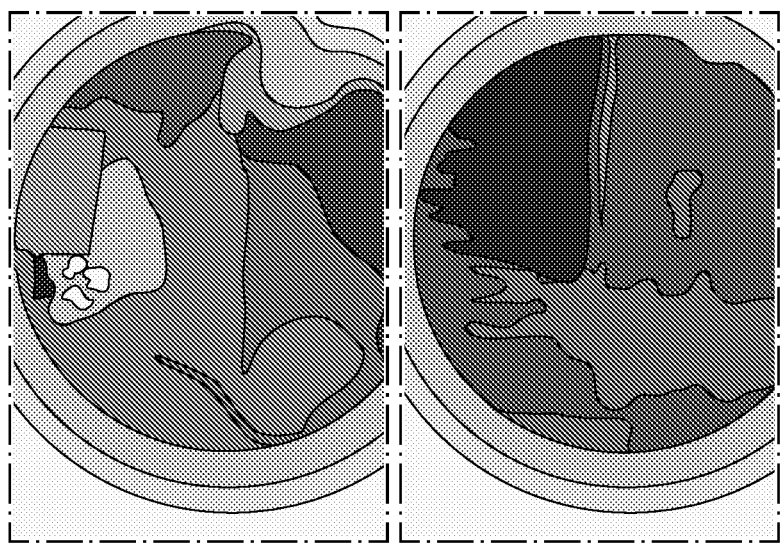

FIG. 4 provides exemplary thermal images of a sewer. Thermal imaging may be used to assist in assessing tunnel conditions, as well as structural issues that may be present, such as identifying leaks in the tunnel wall. In the thermal images in FIG. 4, the water level of the tunnel can be seen, as well as objects in the path of the sensor. Leaks are identifiable in the lower left hand side image, though difficult to see without image processing to enhance the features. The right hand image in FIG. 4 shows a hot water pipe and a cold water pipe. In one embodiment, thermal imaging may be used to assist in leak detection within tunnels. The leak can be identified as a hot spot (e.g. hot water) or a cold spot (e.g. cold supply water, ground water, etc.) on the thermal image. A thermal image of a hot and cold water pipe is simpler to distinguish with the naked eye from a non-processed thermal image, than an actual tunnel wall leak. An identified leak may be tagged with the geospatial position of the telerobot 160 at the time of image capture. This information may be subsequently used to affect a repair of the leak.

Figure 5:
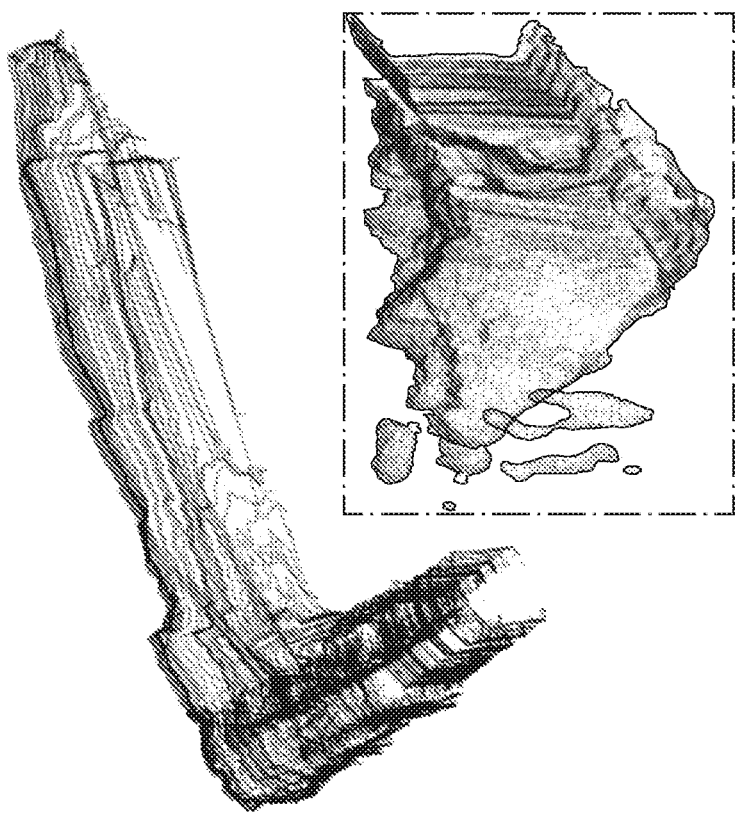
FIG. 5 provides exemplary geospatially positioned laser scans.
Figure 5:
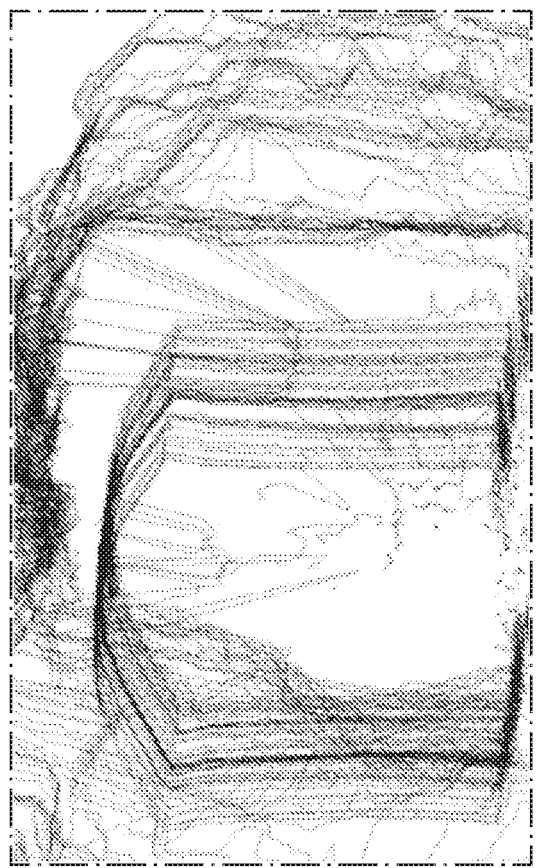
Figure 5:
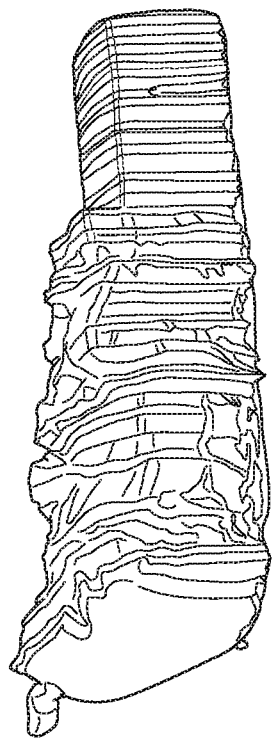

FIG. 5 provides exemplary geospatially positioned laser scans and renderings taken by the laser scanner of a telerobot 160.

Figure 6:
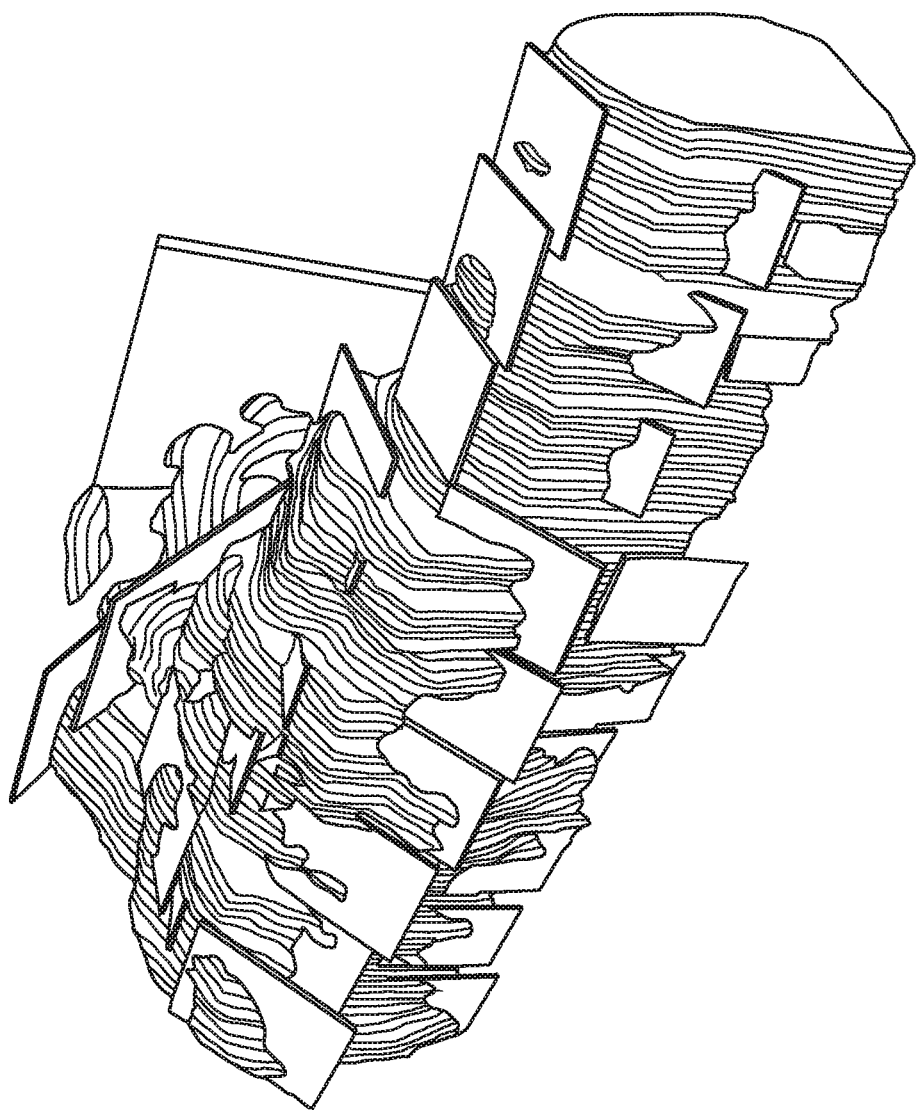
FIG. 6 is an exemplary perspective view of an embodiment of a subsurface mapping generated from a fusion of a plurality of sensor readings from outside the cavity.

FIG. 6 is an exemplar mapping of a surface of a subsurface cavity constructed by combining the imaging and scanning data collected for each geospatial location. In an aspect, the mobile control center 110 may be operative to generate the mapping from data transmitted wirelessly from the telerobots 160 in the subsurface cavity 102.

Figure 7:
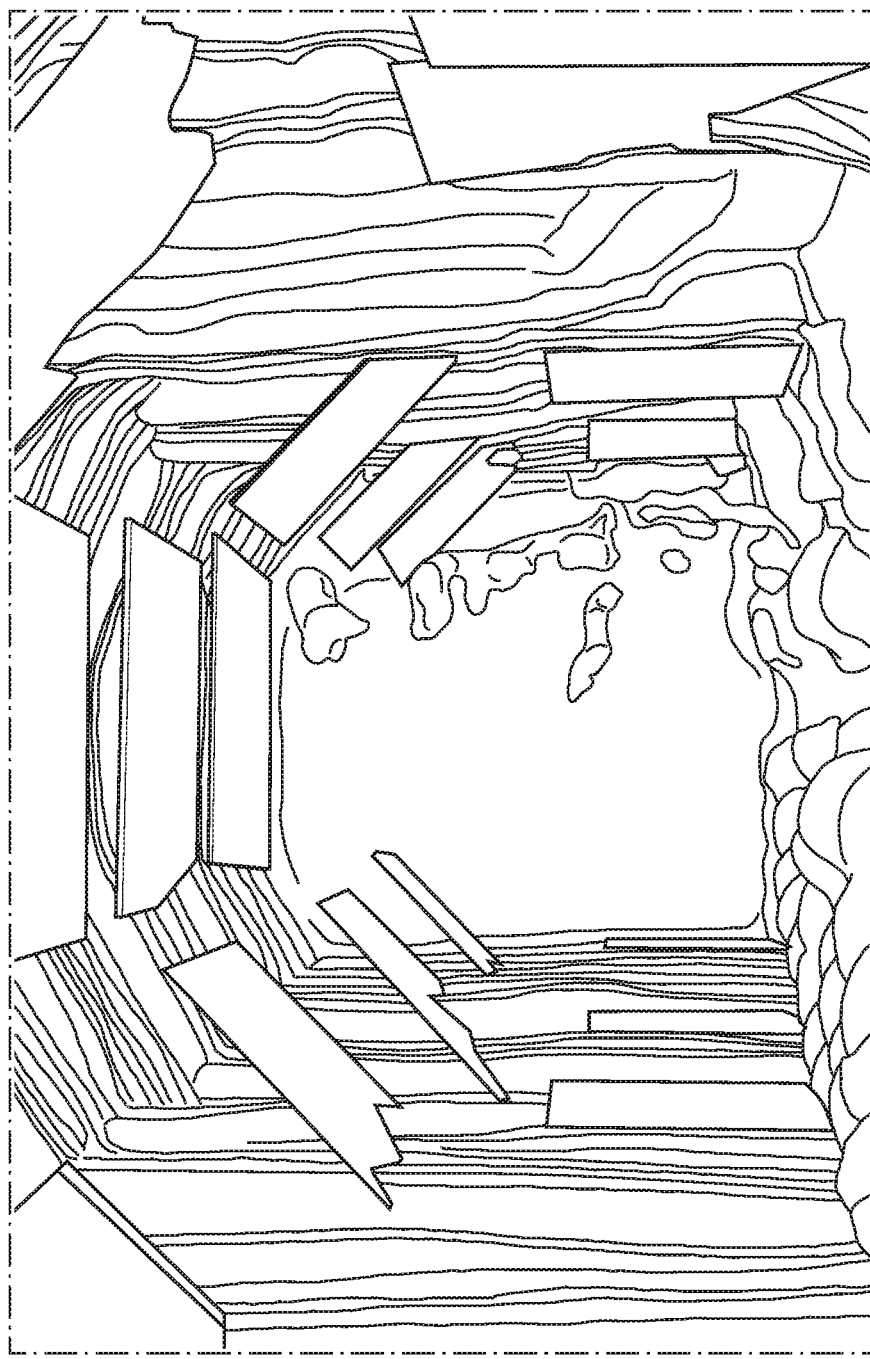
FIG. 7 is an exemplary view of the subsurface mapping from within the cavity.

FIG. 7 is a further view of the exemplar mapping of FIG. 6 from within the subsurface cavity. The mapping is generated by combining the laser scan data, the infrared data, the thermal imaging, sonar, radar, or other scanning and imaging data taken at each geospatial location within the subsurface cavity 102.

Figure 8:
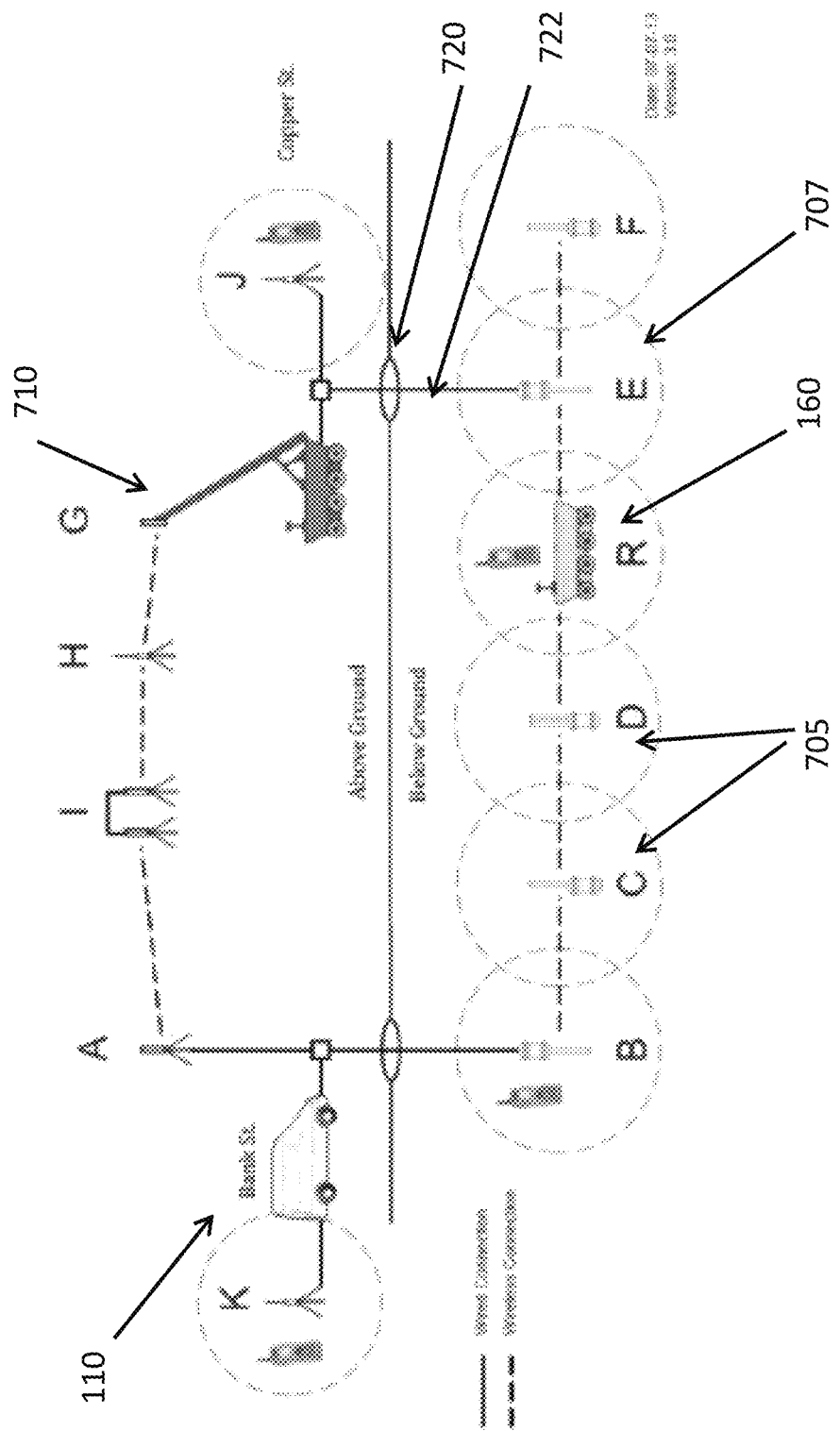
FIG. 8 illustrates a further embodiment of a robotic mapping system.

In an alternative embodiment, communications from the mobile control center 110 may be facilitated not by a daisy chain of telerobots 160 but by the inclusion of a plurality of relays 705 located within the subsurface cavity 102. FIG. 8 is a schematic diagram showing an installation whereby an additional access tunnel 720 to the subsurface cavity 102 has been used to provide for a remote relay 707 separate from the mobile control center 110. The plurality of relays 705 within the subsurface cavity 102 to provide communications to the telerobot(s) 160. The additional access tunnel 720 provides for a direct wired connection 722 to the remote relay 707. A mobile wireless relay 710 is provided above ground to provide a communications link between the mobile control center 110 and the remote relay 707. In this fashion for extended underground networks, such as sewer systems, the mobile control center 110 can maintain a plurality of communications paths to the robot 760, and even switch communication paths as the distance traversed makes the tethered relay system impractical.

In a further embodiment, to provide data regarding an underground area that is correctly geospatially situated, and therefore measurable with reference to locations in the real world, the telerobot 160 is equipped with an inertial navigation system to locate the telerobot 160 in space. This allows data captured by the telerobot 160 to be associated with a geospatial location. The inertial navigation system is able to provide the mobile control center 110 with real time data regarding the position of the telerobot 160 within the mine cavity, or otherwise within the area for which data is being collected.

Figure 9:
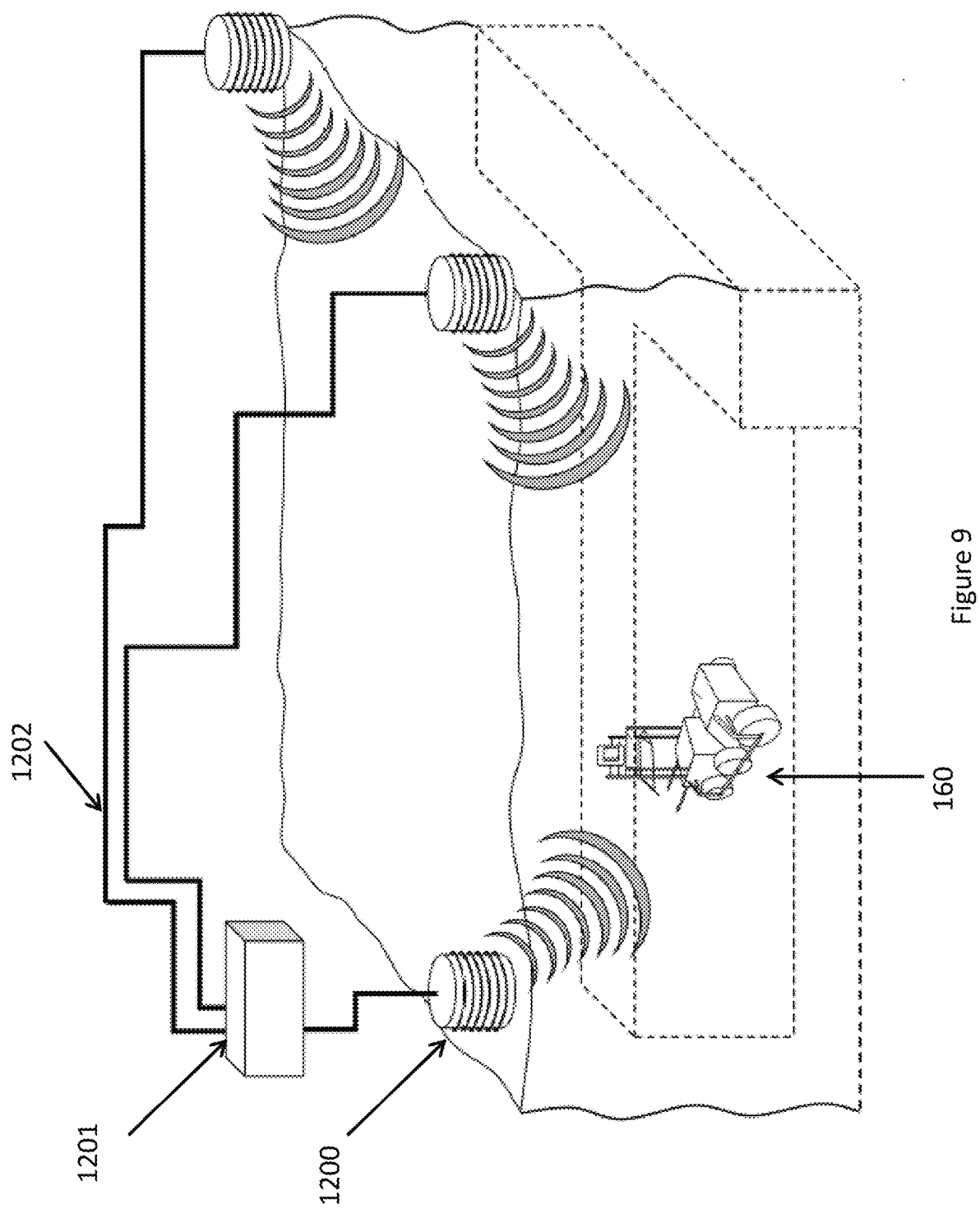
FIG. 9 is a schematic diagram of an embodiment of an avionics navigation system.

Referring now to FIG. 9, the telerobot 160 is equipped with a subsurface avionics navigation system comprising a multisensor navigation subsystem and a communications subsystem. It will be appreciated by those skilled in the art that the system of this embodiment could also be used with a different vehicle, such as affixed to or carried by or on humans (for example, miners) or affixed to, carried by, or integrated with assets—such as machinery, vehicles, submersible crafts, or automated devices—within a subsurface environment (including an underwater environment), and perform the same or similar function. Typical subsurface environments for the subsurface avionics system of the present disclosure include, without limitation, pipes, sewers, tunnels, underwater environments (including open water or underwater caves/tunnels), and below the surface of the moon or other extraterrestrial body.

The multisensor navigation subsystem of the subsurface avionics system shown in FIG. 9 combines an inertial navigation system with a subsurface positioning navigation system. The inertial navigation system is used to track movement in the subsurface relative to the initial position of the telerobot 160 and the subsurface positioning navigation system is used as an intermittent recalibration or verification of the inertial system by triangulation using signals generated by localized antennae. The subsurface positioning navigation system acts to verify or re-calibrate positioning to reduce or compensate for unbounded errors generated by the inertial navigation system as the telerobot travels through the subsurface.

In the embodiment of FIG. 9, the primary means of navigation employed by the subsurface telerobot is through the use of the on-board inertial navigation system, which may be a Subsurface Avionics System (SAS) element. The inertial navigation system of this embodiment is calibrated to start from a known geospatial position as an initial reference point. For example, the initial geospatially known reference point may be the tunnel entrance or access shaft 103 entrance (see FIG. 1). As the telerobot 160 moves down the tunnel from the initial position, on-board instrumentation generates data related to the vertical, horizontal and rotational movement of the telerobot 160 from the initial reference point. As the telerobot 160 moves through the subsurface, the data generated from the instrumentation may be used by the inertial navigation system to derive the three-dimensional movement of the telerobot 160 within the subsurface and to provide an estimate of the three-dimensional position of the telerobot 160 in the subsurface relative to the initial reference point.

The inertial navigation system of the telerobot 160 of this embodiment may be a conventional inertial navigation system known in the art. The system uses the principles of dead reckoning that uses known location, velocity and time to give displacement, therefore new location. In general, sensitive accelerometers and gyroscopes on the stable telerobot 160 platform are used to sense the change in acceleration as the telerobot 160 as it moves through the subsurface, which are then used to determine the velocity of the telerobot 160 and the displacement from its initial position.

As the telerobot 160 begins to move, the accelerometers sense the change in movement and produce an output signal used with algorithms to calculate velocity. In general, three accelerometers may be used to sense the (a) horizontal component of movement in one plane (the X axis), (b) horizontal component of movement in a second plane perpendicular to the first plane (the Y axis), and (c) the vertical component of movement (the Z axis) perpendicular to both planes. The accelerometers are affected by gravity that will constantly hold the accelerometers in error and give a constant output proportional to gravity. This error may be kept constant and linear by a gyroscopic stabling system that is employed to keep the platform level to the surface of the earth. In general, the gyroscopic system may utilise three directional gyros each having two axes of rotation selected from the X, Y and Z axes. As the earth rotates, the gyros will maintain the platform stable in relation to space, therefore the earth rotates around the gyro. The interaction between these two reference frames is described in more detail below.

Figure 11:
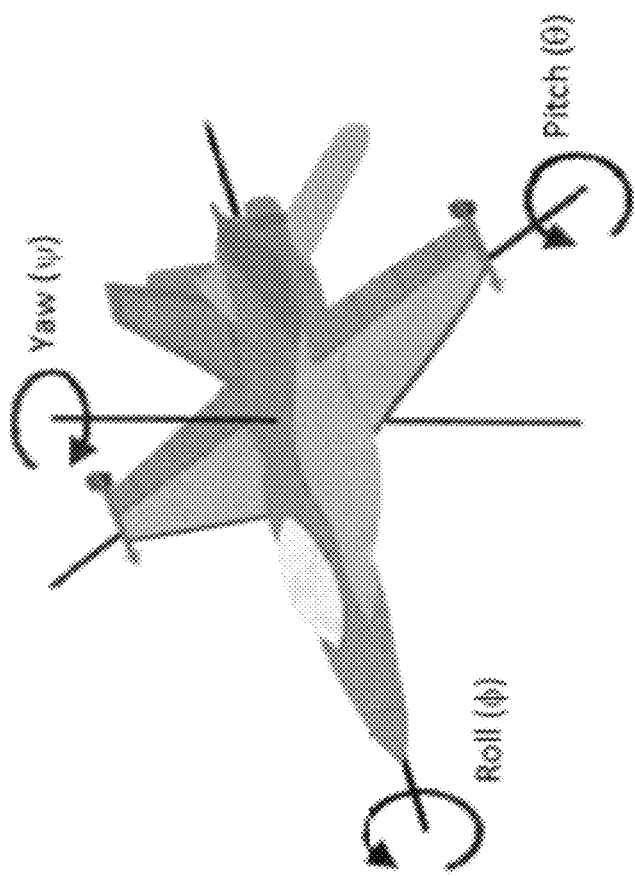
FIG. 11 is an exemplary diagram showing typical yaw, roll and pitch.

The reference frames commonly used for inertial navigation systems are shown in FIGS. 10 and 11. FIG. 10 shows the typical XYZ reference frame, which is commonly termed the Earth-centerd Earth-fixed or ECEF frame, which has its origin as the center of the Earth. Also shown in FIG. 10 is the typical north, east, down (NED) coordinate navigation system, commonly used in aircraft inertial navigation systems. FIG. 11 shows the body frame that is typically aligned with the axes of the inertial measurement unit (IMU) of the craft. The IMU is an electronic device that measures and reports on a craft's velocity, orientation, and gravitational forces, using a combination of accelerometers and gyroscopes.

To transition between frames, several rotation matrices are used. The first matrix translates measurements from the body frame to the navigation frame according to the following formula:

$$R_b^n = \begin{bmatrix} c\theta c\psi & s\phi s\theta c\psi - c\phi s\psi & s\phi s\psi + c\phi s\theta c\psi \\ c\theta s\psi & c\phi c\psi + s\phi s\theta s\psi & c\phi s\theta s\psi - s\phi c\psi \\ -s\theta & s\phi c\theta & c\phi c\theta \end{bmatrix}$$

where $\phi$ is roll, $\theta$ is pitch, and $\psi$ is yaw (as shown in FIG. 11). This sequence has singularities when the pitch is +/−90 degrees because at this angle both the roll and yaw have similar effects. Methods known to those in the art may be used to account for this problem, if necessary.

A second matrix is used to transform points from the ECEF frame to the navigation frame, as follows:

$$R_e^n = \begin{bmatrix} -s\phi c\lambda & -s\phi s\lambda & c\phi \\ -s\lambda & c\lambda & 0 \\ -c\phi c\lambda & -c\phi s\lambda & -s\phi \end{bmatrix}$$

where $\phi$ is latitude and $\lambda$ is longitude. Using the rotations calculated above, the third rotation can be determined according to the following:

$$R_b^e = R_n^e R_b^n$$

The third rotation may be integrated into standard navigation equations as follows. Newton's second law of motion states that a change in motion occurs as a force is applied to a body. To calculate the specific force, both sides of the equation are divided by mass according to the following equation:

$$f/m = a = S$$

For inertial navigation, accelerometers detect accelerations due to forces, typically expressed as S, exerted on the body. The navigation equations for the ECEF system are as follows:

$$\begin{bmatrix} \dot{V}^e \\ \dot{P}^e \\ \dot{\Phi} \end{bmatrix} = \begin{bmatrix} -2\Omega_{ie}^e & -\Omega_{ie}^e \Omega_{ie}^e & 0 \\ I & 0 & 0 \\ 0 & 0 & Q \end{bmatrix} \begin{bmatrix} V \\ P \\ \Phi \end{bmatrix} + \begin{bmatrix} R_b^e & R_b^e & 0 \\ 0 & 0 & 0 \\ 0 & 0 & 0 \end{bmatrix} \begin{bmatrix} g_{SHC}^e \\ S^b \\ \omega \end{bmatrix}$$

$$\Omega_{ie}^e = \begin{bmatrix} 0 & -\omega_{ie} & 0 \\ \omega_{ie} & 0 & 0 \\ 0 & 0 & 0 \end{bmatrix}$$

where $\omega_{ie}$ is the rotation rate of the Earth, R is the rotation matrix between different coordinate systems, P is the position and V is the velocity vector in the ECEF coordinate system as denoted by the superscript e.

The attitude will be changed from Euler's roll, pitch and yaw quaternions. Quaternions will help to prevent the body to navigation rotation matrix from becoming non-orthogonal:

$$Q = \frac{1}{2} \begin{bmatrix} 0 & \omega_z & -\omega_y & \omega_x \\ -\omega_z & 0 & \omega_x & \omega_y \\ \omega_y & -\omega_x & 0 & \omega_z \\ -\omega_x & -\omega_y & -\omega_z & 0 \end{bmatrix}$$

Inertial navigation systems are susceptible to various errors including sensor generated errors, including alignment errors, accelerator bias or offset, non-orthogonality of gyros and accelerometers, gyro drift bias (for example due to temperature changes), gyro scale factor error and random noise. Errors in the accelerations and angular rates increase steadily over time in the position and velocity components of the craft due to integration. These may be caused by or compounded by other errors, such as Earth rate drift, transport drift, mechanical drift (all errors from a gyroscopic system) and other errors that affect the accelerometers, such as errors due to the Coriolis effect, centripetal force, and the curvature of the Earth (Schuler tuning accounts for this).

As a telerobot 160 begins to move in the subsurface, the internal sensors of the inertial navigation system begin to work. The accelerometers sense movement and the triaxial gyroscopes keep track of small displacements and rotations. This information provides individual x,y,z coordinate data for the telerobot 160 as it progresses and may be stored in a data processing device, for example the telerobot 160 on-board computer or an external computer receiving signals from the telerobot 160. Even the best gyros drift approximately one degree per hour. To compensate for gyroscope drift and other errors, a re-reference may be required for this method to work effectively.

Figure 12:
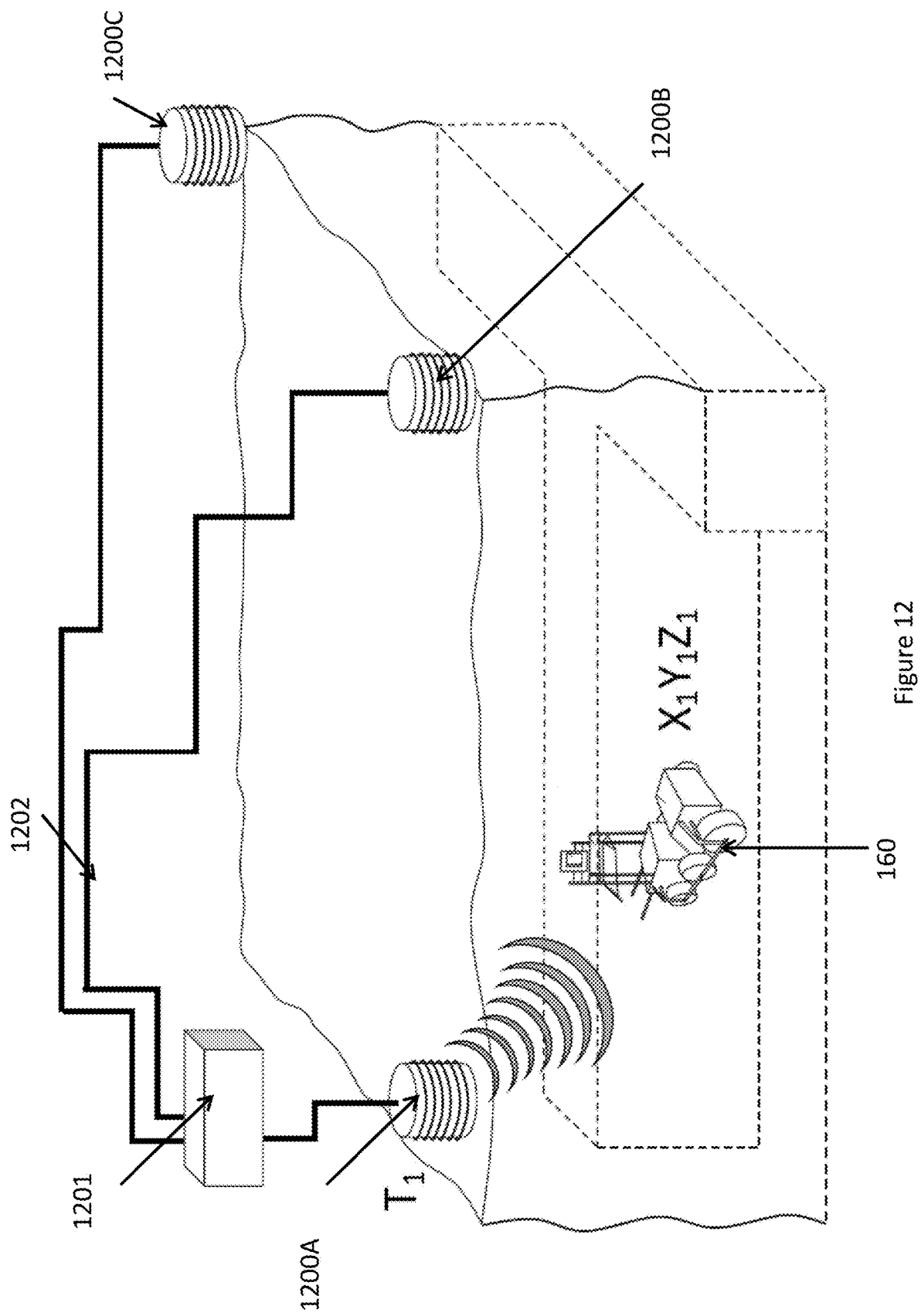
FIG. 12 is a schematic diagram of an embodiment of an avionics navigation system at reference time $T_1$.

In the embodiment of FIG. 12, the geospatial information generated by the onboard inertial navigation system of the telerobot 160 is verified, corrected, or re-calibrated, at a predetermined interval using positional information derived from the telerobot's subsurface positioning navigation system. Various control system techniques known in the art, such as Kalman filtering, are suitable for combining inertial measurements and external positional measurements into appropriate navigation data.

The subsurface positioning navigation system of the telerobot of the embodiment shown in FIG. 12 includes a communications subsystem with a means of receiving coded emr signals, for example a Very Low Frequency (VLF) radio signal, from antennas 1200 positioned about the communications zone. VLF signals are preferred for their transmissibility through various subsurface environments, however other frequencies may be used. The coded emr signals include identifier information that can be discriminated by an on-board computer so the particular antenna 1200 from which the signal was sent is identifiable. In particular, the subsurface positioning navigation system receives signals via the communications subsystem transmitted sequentially through the subsurface by each of a first, second and third antenna as a series of signal bursts, and time of flight data is derived at least in part from data identifying a phase shift between successive transmissions.

In the embodiment of FIG. 12, transmission of signals used for positional information occurs using a radio frequency transmission capable of penetrating the medium, for example using a VLF radio transmission system. This system may be capable of data transmission through rock for distances of up to 2000 metres. However, other electromagnetic radiation (emr) transmission systems may be suitable depending upon the environment. Stratton, J. A., *Electromagnetic Theory*, McGraw-Hill (1941) provides a formula to calculate the electric and magnetic components of an electromagnetic wave in a medium as follows:

$$E = E_0 \cdot \exp(-\alpha_z) \cdot \exp(i(\omega t - \beta_z))$$

$$H = H_0 \cdot \exp(-\alpha_z) \cdot \exp(i(\omega t - \beta_z))$$

$$\delta = \frac{1}{\alpha} = \sqrt{\frac{2}{\omega \mu \sigma}} \text{ meters}$$

where:
α=attentuation constant in Nepers
z=propagation distance in m
ω=frequency in radians/s
β=phase constant in radians/m
μ=magnetic permeability
σ=conductivity in siemens/m
δ=skin depth in meters=length at which wave attenuates to $$\frac{1}{e}$$

or (0.386) of its value

For transmission through a rock mass, for example, the penetration depth is affected by conductivity (mineral content) and water content (% moisture). If the rock mass is highly conductive, the energy of transmission will dissipate within a few metres. Lower frequencies allow for greater penetration, but the difficulty of the precise timing of the signals is exacerbated. For transmission through other environments, for example when the telerobot 160 is travelling through sewers or tunnels below a municipal infrastructure, the penetration depth may be influenced by man-made objects such as pipes, concrete structures, materials of varying density such as sand, gravel, clay, etc.

In the embodiment of FIG. 12, there are at least first, second and third antennas 1200A, 1200B, and 1200C for respectively transmitting first, second and third antenna emr signals, for example as shown in the embodiment of FIG. 12 as VLF antennae. There may be four or five VLF antennae, or more, if desired, circumscribing the desired communications zone at different levels, as shown for example in the embodiment of FIG. 12. Each VLF antenna is disposed within communications range of both the current and expected prospective positions of the telerobot 160. Most of the VLF antennae in this embodiment only need to be capable of signal transmission and not signal reception, except for the mobile station antenna, which must be capable of signal reception as described below. The VLF antennae are connected to an atomic clock station 1201, for example via coax connecting cables 1202, which contains or is connected to an atomic clock 1201. Each connecting cable 1202 is of equal length for each VLF antennae (1200A, 1200B, or 1200C) that is connected to the atomic clock station 1201, regardless of the distance of the VLF antennae from the atomic clock station 1201, so that the VLF antennae are operating in synchronous time. The person skilled in the art will appreciate that any means of ensuring synchronous time for the VLF antennae will be applicable. For example, each VLF antennae may include an atomic clock and each atomic clock may be operating in synchronous time.

Referring to FIG. 12, once the telerobot 160 begins to move within the subsurface, a first VLF antenna 1200A transmits a first signal at time $T_1$ that contains time data from the atomic clock 1201 and is received by the receiver of the telerobot's 160 subsurface positioning navigation system and assigned coordinates $X_1Y_1Z_1$ based on the telerobot's 160 position at the time the signal is received. $T_1$ thus corresponds to an initial position on a sine wave representing the time the first signal leaves the first VLF antenna 1200A. In a preferred embodiment, the first VLF antenna 1200A transmits a burst of a predetermined number of pulses each, in turn, precisely calibrated to transmit at specified time intervals, for example every 5 milliseconds. This results in a phase measurement system that can be implemented in a digital measurement system using noisy signals. It also allows the telerobot's 160 subsurface positioning navigation system to associate the pulses with the specific VLF antenna making the transmission, by the pulse count; for example, if the transmissions cycle between the VLF antennas after each VLF antenna has emitted a specific number of pulses, say 10 pulses over 50 milliseconds, then it is known that after the first 10 pulses from the first VLF antenna 1200A the signal is being transmitted from the second VLF antenna 1200B, and after 10 more pulses the signal is being transmitted from the third VLF antenna 1200C, etc.

Figure 13:
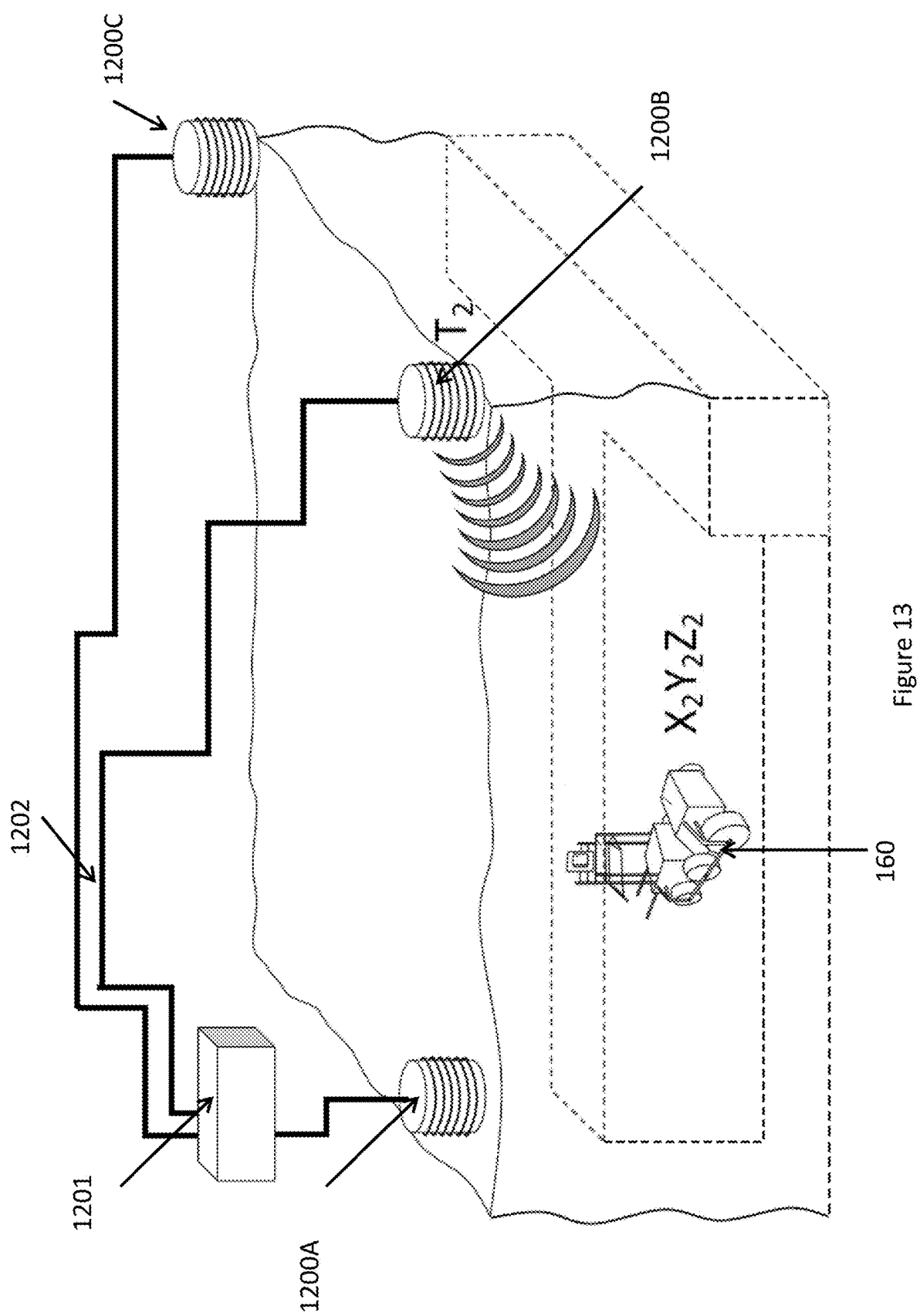
FIG. 13 is a schematic diagram of an embodiment of an avionics navigation system at reference time $T_2$.

As all of the VLF antennae are operating in synchronous time, $T_2$ corresponds to a second position on the sine wave representing the time a second signal leaves a second VLF antenna 1200B, as shown in FIG. 13, which is received by the telerobot 160 and assigned coordinates $X_2Y_2Z_2$ based on the position of the telerobot 160 at the time the second signal (burst of pulses) is received. The second VLF antenna 1200B thus transmits a second burst of pulses (which may commence immediately after the first VLF antenna 1200A is finished sending the burst of pulses associated with the first VLF antenna 1200A) each, in turn, precisely calibrated to transmit at the specified time intervals, for example every 5 milliseconds.

Figure 14:
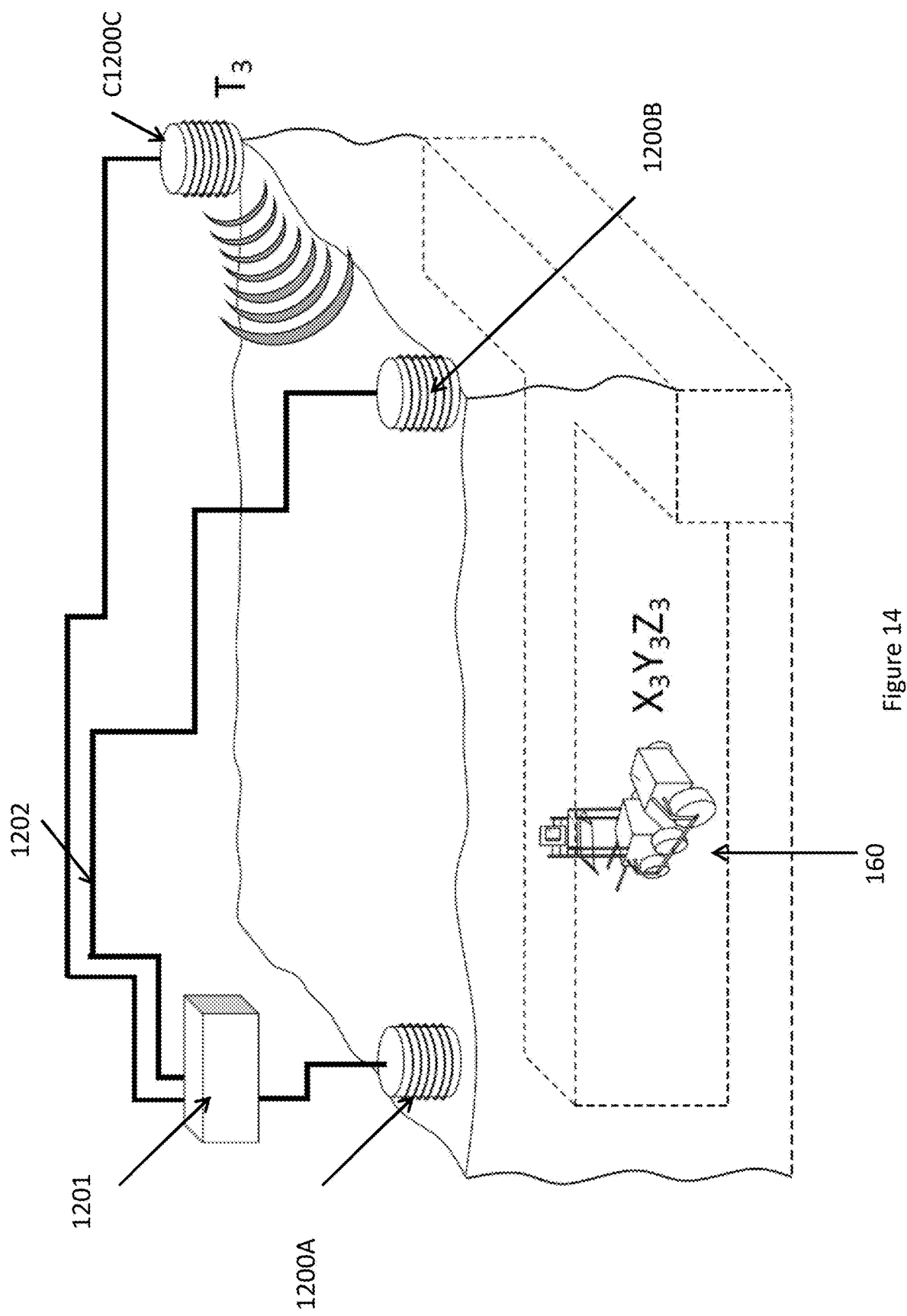
FIG. 14 is a schematic diagram of an embodiment of an avionics navigation system at reference time $T_3$.

$T_3$ similarly corresponds to a third position on the sine wave representing the time a third signal leaves a third VLF antenna 1200C, if present, as shown in FIG. 14, which is received by the telerobot 160 and assigned coordinates $X_3Y_3Z_3$ based on the position of the telerobot 160 at the time the third signal is received. The third VLF antenna 1200C transmits a third burst of pulses (which may commence immediately after the second VLF antenna 1200B is finished sending the burst of pulses associated with the second VLF antenna 1200B) each, in turn, precisely calibrated to transmit at the specified time intervals, for example every 5 milliseconds.

In this embodiment, the telerobot 160 is capable of signal transmission and reception. Once the telerobot 160 receives the signals from the VLF antennae, the telerobot 160 detects its position and transmits a characteristic signal containing at least a unique identifier, and data representing the position of the telerobot 160 or time of flight.

The mobile station 110 (which may also be a stationary control or base station) may contain an antenna that is disposed within communications range of both the current and expected prospective positions of the telerobot 160. The mobile station antenna receives from the telerobot 160 the characteristic signals containing positional data.

The characteristic signals from the telerobot 160 are then transmitted from the mobile station antenna back to the station computer, for example via coaxial cable. The mobile station computer calculates any change in position of the telerobot 160 based on the time of flight of the signals received by the telerobot from the VLF antennas 1200. In this embodiment, time of flight can be derived from the phase differential between the multiple transmitted signals received and time-stamped by the telerobot 160, which have subsequently been transmitted to the mobile station antenna. The phase shift is proportional to the distance travelled by the signal, and can be calibrated to provide the (x, y, z) position in time for the telerobot 160, for example as follows. In other embodiments, these calculations may be performed by a computer on-board the telerobot, as desired.

The following describes a mathematical derivation of a phase measurement system that can be implemented in a digital measurement system using noisy signals. The averaging effect of the convolution process reduces the error in the final measurement. The following formulae are provided for an understanding of at least one manner in which data provided by the disclosure may be analyzed and utilized. However, the method of the disclosure relates to a system for generating positional data, and is not intended to be limited by how the data is processed or used.

From Maxwell's equations, the electric field at time t and position x can be written as:

$$E(x,t) = E_o e^{i(\omega t - \lambda x)}$$

where:
$\lambda$=wavelength (also equal to v/f; velocity/frequency)
x=position (distance) in m
$\omega$=frequency in radians/s Without loss of generality, the signal being transmitted can be considered as a sine wave:

$$S = \sin(\omega t)$$

A receiver (and thus a telerobot 160) at position (x, y, z) can be considered within a volume. Assume four transmitters (i.e. antennae 20), A, B, C and D, located at points $(x_A, y_A, z_A)$, $(x_B, y_B, z_B)$, $(x_C, y_C, z_C)$ and $(x_D, y_D, z_D)$ each transmitting a burst of sine waves each in turn, precisely calibrated to commence (for example) every 5 milliseconds. The signals received by the receiver will be $S=\sin(\omega t+\delta t)$, where $\delta t$ is the time of flight of the signal. This can be thought of as producing a phase shift that will be different for each source. This phase shift expressed in terms of the signal wavelength would be, for example, from transmitter A to the receiver:

$$\theta_A = \frac{D_A}{\lambda}$$

where $D_A$ is the distance from transmitter A to the receiver, and $\lambda$ is the wavelength of the frequency of interest in the medium. Converting the phase shift to a distance is accomplished by the following:

$$D_A = \lambda \frac{\text{meters}}{360 \text{ degrees}} \times \theta_A \text{ degrees}$$

Expressing the received signal in terms of a sine wave with a phase shift, there are four equations:

$$S_A = \sin(\omega t + \theta_A)$$

$$S_B = \sin(\omega t + \theta_B)$$

$$S_C = \sin(\omega t + \theta_C)$$

$$S_D = \sin(\omega t + \theta_D)$$

The signals can be stored in circuitry on board the telerobot that can numerically determine the phase shift $\theta$ for each signal. It may also be possible for all of this information to be transmitted back to the mobile station computer for such calculations. Absolute phase cannot be measured at the receiver, only relative phase differences. The phase differences represent hyperbolic curves, and the intersection of the curves provides the (x, y, z) position of the receiver. Four transmitters are preferred to provide enough information for the three variables that will locate the receiver with the preferred degree of accuracy. The position of the receiver may be determined if only three transmitters are used, although the result may be less accurate.

The distance between two points in space located at (x, y, z) and $(x_A, y_A, z_A)$ is given by the 3D version of the Pythagorean theorem:

$$D = \sqrt{(x-x_A)^2 + (y-y_A)^2 + (z-z_A)^2}$$

By measuring the phase differences between successive transmissions, it is possible to convert this to a difference in the distance between the distances from the receiver and two of the transmitters. Define $D_{AB}$ as the difference between $D_A$ and $D_B$ as defined above. The differences in distance can be expressed as:

$$D_A - D_B = D_{AB} = \sqrt{(x-x_A)^2 + (y-y_A)^2 + (z-z_A)^2} - \sqrt{(x-x_B)^2 + (y-y_B)^2 + (z-z_B)^2}$$

$$D_A - D_C = D_{AC} = \sqrt{(x-x_A)^2 + (y-y_A)^2 + (z-z_A)^2} - \sqrt{(x-x_C)^2 + (y-y_C)^2 + (z-z_C)^2}$$

$$D_C - D_B = D_{CB} = \sqrt{(x-x_C)^2 + (y-y_C)^2 + (z-z_C)^2} - \sqrt{(x-x_B)^2 + (y-y_B)^2 + (z-z_B)^2}$$

$$D_C - D_D = D_{CD} = \sqrt{(x-x_C)^2 + (y-y_C)^2 + (z-z_C)^2} - \sqrt{(x-x_D)^2 + (y-y_D)^2 + (z-z_D)^2}$$

Rearranging the equations gives:

$$D_{AB} - \sqrt{(x-x_A)^2 + (y-y_A)^2 + (z-z_A)^2} = \sqrt{(x-x_B)^2 + (y-y_B)^2 + (z-z_B)^2}$$

$$D_{AC} - \sqrt{(x-x_A)^2 + (y-y_A)^2 + (z-z_A)^2} = \sqrt{(x-x_C)^2 + (y-y_C)^2 + (z-z_C)^2}$$

$$D_{CB} - \sqrt{(x-x_C)^2 + (y-y_C)^2 + (z-z_C)^2} = \sqrt{(x-x_B)^2 + (y-y_B)^2 + (z-z_B)^2}$$

$$D_{CD} = \sqrt{(x-x_C)^2+(y-y_C)^2+(z-z_C)^2} = \sqrt{(x-x_D)^2+(y+y_D)^2+(z-z_D)^2}$$

By squaring both sides of each equation and simplifying, the following system of equations results:

$$\sqrt{(x-x_A)^2+(y-y_A)^2+(z-z_A)^2} = [-D^2_{AB}+2xx_A-x^2_A+2yy_A-y^2_A+2zz_A-z^2_A-2xx_B+x^2_B-2yy_B+y^2_B-2zz_B+z^2_B]/(-2D_{AB})$$

$$\sqrt{(x-x_A)^2+(y-y_A)^2+(z-z_A)^2} = [-D^2_{AC}+2xx_A-x^2_A+2yy_A-y^2_A+2zz_A-z^2_A-2xx_C+x^2_C-2yy_C+y^2_C-2zz_C+z^2_C]/(-2D_{AC})$$

$$\sqrt{(x-x_C)^2+(y-y_C)^2+(z-z_C)^2} = [-D^2_{CB}+2xx_C+x^2_C+2yy_C+y^2_C+2zz_C-z^2_C-2xx_B+x^2_B-2yy_B+y^2_B-2zz_B+z^2_B]/(-2D_{CB})$$

$$\sqrt{(x-x_C)^2+(y-y_C)^2+(+z-z_C)^2} = [D^2_{CD}+2xx_C-x^2_C+2yy_C-y^2_C+2zz_C-z^2_C-2xx_D+x^2_D-2yy_D+y^2_D-2zz_D+z^2_D]/(-2D_{CD})$$

This system of equations can be solved to provide the x, y and z coordinates of the receiver, and thus of the telerobot 160.

In the embodiment shown in FIG. 9, the telerobot 160 is equipped with a communications subsystem to receive control and non-control data from exterior sources, such as a VLF antenna, and to transmit non-control data. For instance, characteristic signals transmitted by the VLF antennae 1200 supply control data that is used by the control system of the telerobot 160 to control the movement and other actions of the telerobot 160. In some embodiments, the control system may operate the telerobot autonomously based on the navigation information and would not receive control data from external sources. However, in the preferred embodiment, as shown in FIG. 9, the telerobot 160 is operated remotely by human operators located at the mobile station using control data transmitted over the communications system.

In embodiments where the telerobot 160 is operated remotely, and optionally also in embodiments where the telerobot 160 is autonomous, the telerobot 160 transmits non-control data directly to one or more of the VLF antennas 1200 for the non-control data to be relayed back to the mobile station 110. The non-control data comprises navigation information based on measurement data from the inertial navigation system and the subsurface positioning system, and/or other sensor data, including imaging data, signal strength data, and other vehicle telemetry. Control data is transmitted from the mobile station 110 and VLF antennas 1200, through the communications channel, to the telerobot 160 using the receiver or transceiver of the telerobot's communications system, which may be the same or a different communication system as used by the telerobot's subsurface positioning navigation system. Similarly, the VLF antenna(e) used to transmit and receive control and/or non-control data to and from the telerobot 160 may be the same or different VLF antenna(e) from the VLF antenna(e) used to transmit emr signals used as input for the telerobot's subsurface positioning navigation system. In other embodiments, the control and/or non-control data may be transmitted or relayed to and from the telerobot via other telerobots.

In some embodiments, sensors are used to augment the positional accuracy of the subsurface avionics system of the disclosure. For example, in some embodiments sensors including radar sensors, pressure sensors or reverse altimeter sensors may be used alone or in combination to provide additional reference data for orientation and positioning of the telerobot 160. These additional sensors may be included in the payload of the telerobot 160.

In some embodiments, there are multiple subsurface telerobots, each with a unique identifier. In this embodiment, the control data includes header and footer information identifying the target telerobot for control. Depending on the header and footer used, the on-board computer or electronics discern whether the control data is intended for other telerobots in the network or for use the control data for its own control operations.

In further embodiment, the communications systems of each telerobot may each transmit a characteristic signal with appended header and footer information comprising identifying information to transmitted signals. The communications systems of each telerobot, or the on-board computer of the telerobot, is capable of analysing the received characteristic signals from other telerobots and triangulating its geoposition, even in the event that the telerobot receiving the signals is out of communication range of the first, second or third VLF antennas.

In another embodiment, the communications systems of each telerobot is preferably capable of transmitting and/or receiving individual positional data on an ongoing basis, which may for example be by means of IP protocol. In this embodiment, the telerobot is capable of signal transmission and reception. Once a telerobot receives the signals from the VLF antennae 20, the telerobot detects its position and then transmits a characteristic signal containing at least a unique identifier, and data representing the position of that telerobot or time of flight. The characteristic signal from the transmitting telerobot is received by all other telerobots within transmission range. The characteristic signals from other telerobots are similarly received and transmitted by telerobots within range to relay the data, in a cascading fashion, through the group of two or more telerobots, until the signals from all (or substantially all) telerobots have been received by the base station antenna.

Because the telerobots in this embodiment not only transmit their own data but also serve as repeaters to transmit data received from other telerobots, the mobile station antenna may be located anywhere within communication range of a single telerobot in the current and expected positions of the telerobots within subsurface area of interest. The mobile station antenna receives from at least one of the telerobots, typically the telerobot(s) in closest proximity to the position of the mobile station antenna, the relayed characteristic signals of all the telerobots containing positional data for each of the telerobots respectively associated with the unique identifier of each telerobot.

The characteristic signals from all of the telerobots are then transmitted from the mobile station antenna back to the mobile station computer, for example via coaxial cable or by any other suitable means. The mobile station computer calculates the change in position of the telerobots based on the time of flight of the signals received by the telerobots from the VLF antennas 1200. In this embodiment, time of flight can be derived from the phase differential between the multiple transmitted signals received and time-stamped by each telerobot, which have subsequently been relayed through the matrix of two or more telerobots to the mobile station antenna. The phase shift is proportional to the distance travelled by the signal, and can be calibrated to provide the (x, y, z) position in time for each telerobot.

In another embodiment, a first telerobot is equipped with an atomic clock, which may also be included in its payload, and transmitters to transmit a characteristic signal at time $T_x$ that contains time data from the on-board atomic clock and is received by the receiver of a second telerobot's subsurface positioning navigation system and assigned coordinates $X_x Y_x Z_x$ based on the second telerobot's position at the time the signal is received. $T_x$ thus corresponds to an initial position on a sine wave representing the time the characteristic signal leaves the first telerobot. In the preferred embodiment, the first telerobot transmits a burst of a predetermined and characteristic number of pulses each, in turn, precisely calibrated to transmit at specified time intervals, for example every 5 milliseconds. This results in a phase measurement system that can be implemented in a digital measurement system using noisy signals. It also allows the second telerobot's subsurface positioning navigation system to associate the pulses with the specific telerobot making the transmission, by the characteristic pulse count. The person skilled in the art will appreciate that each telerobot may be equipped to transmit and receive signals to or from other telerobots in this manner. The positional data derived from signals that originated from other telerobots can be used to supplement the positional data derived from antenna signals as desired to enhance the efficiency of the system. In other embodiments, the positional data of a particular telerobot can be determined using signals from other telerobots even when the particular telerobot may be in communication range with one or two or even no VLF antennae. The accuracy of such positional data may be a function of the number of transmissions received from either the VLF antennae 1200 or other telerobots and the known or calculated positional data and the accuracy of such data for the telerobots from which transmissions are received.

In other embodiments, a first telerobot may remain stationary while emitting a characteristic signal that is received by a second telerobot and used to determine positional data as the second telerobot moves through the subsurface. Then, after a predetermined period of time or distance, the second telerobot may remain stationary while emitting a characteristic signal that is received by the first telerobot and used to determine positional data as the first telerobot moves through the subsurface. In this manner, the errors associated with the positional data for each telerobot can be minimized. The person skilled in the art will appreciate that such a system may require additional signals from one or more VLF antennae 1200 and/or one or more additional telerobots 160, operating in the same fashion as those previously described, to supplement the accuracy of the positional data determined for each telerobot as it moves through the subsurface.

In another embodiment, the VLF antennae 1200 used in the system of the present disclosure may all be located on the surface while the telerobots 160 move through the subsurface. In other embodiments, one or more VLF antennae 1200 may be located in the subsurface above the telerobot 160 or in the subsurface below the telerobot 160.

In another embodiment, the system may use only one VLF antenna equipped with an atomic clock to send a signal that is then relayed or repeated by two or more repeaters or antennae, each repeaters or antenna adding a characteristic identifier for that repeater or antenna. In this embodiment, the telerobot receives the initial signal from the VLF antenna equipped with the atomic clock, or some other means of accurate time keeping, and the additional signals from each repeater or antenna. The characteristic identifiers added to the additional signals relayed by the repeaters enable the telerobot's on-board computer, or the base station computer that receives the data from the telerobot, to determine the time that the signals were repeated by the repeaters or antennae and which repeater or antenna relayed the signal. This information is combined with the known location for each repeater or antenna and the time the signal relayed by each repeater or antenna is received by the telerobot to provide positional data for the telerobot within the communications zone.

It will be appreciated by the person skilled in the art that other telerobots may also be used as repeaters in this embodiment, although the accuracy of the positional data derived from those repeated signals would be a function of the accuracy of the positional data for the telerobot acting as the repeater at the time the signal is relayed.

In the above embodiments, the person skilled in the art will appreciate that positional data for each telerobot may be transmitted or relayed back the base station on an ongoing basis and in real-time as the telerobot moves through the subsurface or may be stored on-board the telerobot and downloaded or transmitted at a later time, as desired.

The person skilled in the art will appreciate that in certain environments or for certain uses, at least one or more of the communications systems of each telerobot may comprise optical receivers and may also comprise optical transmitters, or optical transceivers, for receiving optical signals from the antennas or from other telerobots. The optical transmitters or transceivers may also transmit optical signals to other telerobots in the network or to one or more of the antennas.

The person skilled in the art will appreciate that in certain environments or for certain uses, at least one or more of the telerobots may comprise an acoustic receiver and may comprise an acoustic transmitter for communication in a similar manner using acoustic signals.

It will thus be appreciated by the person skilled in the art that the disclosure described herein may be used in any subsurface environment in which a radio frequency, light or acoustic transmission is capable of penetrating the medium. For example, the present disclosure has application in submarine environments where the subsurface avionics system of the disclosure may be used to determine the position of humans (for example, divers) or assets at any given depth, for example on the bed of the water body, such as the ocean floor. The present disclosure also has application in other environments, such as in extra-terrestrial or nano-environments. The functionality of the present disclosure is not frequency dependent. The frequency can be selected to suit the particular environment in which the subsurface avionics system of the present disclosure is employed. In microenvironments a higher frequency may be used, whereas in a macro-environment a very low frequency may be used.

In another embodiment of the disclosure, instead of VLF loop antennas, VLF ferrite core antennae can be used for emr signal transmission and reception. When a VLF loop antenna is wrapped around a ferrite core, instead of as a continuous loop, this enables transmission of a VLF radio signal from a known point since each VLF ferrite core antenna can be placed in a predetermined position.

Various embodiments of the present disclosure having been thus described in detail by way of example, it will be apparent to those skilled in the art that variations and modifications may be made without departing from the disclosure. The disclosure includes all such variations and modifications as fall within the scope of the appended claims.

I claim:

1. A robotic subsurface mapping system comprising:
  a control center located proximate to an entry point to a subsurface to be mapped;
  at least one mapping robot, the at least one mapping robot comprising:
    at least one sensor for capturing imaging and scanning data of the subsurface in relation to the at least one robot;

a subsurface avionics subsystem for continuously generating geospatial data for determining in real-time the position of the at least one robot within the subsurface;

a data processing subsystem for storing the imaging and scanning data, relating it to the geospatial data and associating the geospatial data and the imaging and scanning data with corresponding timing data; and a communications subsystem configured to transmit the captured imaging and scanning data, the geospatial data, and the timing data to the control center, wherein the subsurface avionics subsystem comprises an inertial navigation system and a subsurface positioning navigation system wherein the subsurface positioning navigation system is configured to receive electromagnetic signals from at least one antenna, wherein the at least one antenna comprises at least first, second and third antennas wherein each of the first, second and third antennas transmit electromagnetic signal pulses in a series of synchronized bursts, wherein the electromagnetic signal pulses are encoded with identifier information to identify which of the at least first, second and third antennas transmitted the electromagnetic signal pulses, and wherein the real-time position of the at least one mapping robot is calculated based on information collected from internal sensors of the inertial navigation system and is verified using the distance the at least one mapping robot is from the at least first, second and third antennas wherein the distance is calculated based on the phase difference between successive bursts from the at least first, second and third antennas.

2. The system of claim 1, wherein the communications subsystem is further configured to receive control data transmitted from the control center.

3. The system of claim 2, further comprising at least one remote relay for relaying the transmitted captured imaging and scanning data, the geospatial data, and the timing data to the mobile control center and for relaying the control date transmitted from the control center.

4. The system of claim 1, wherein the at least one mapping robot further comprises a plurality of mapping robots, and wherein the plurality of mapping robots each comprise a communications subsystem for receiving the transmitted captured imaging and scanning data, the geospatial data, and the timing data, and communicating the transmitted captured imaging and scanning data, the geospatial data, and the timing data to the control center and for receiving control data from the control center and communicating it to the plurality of mapping robots.

5. The system of claim 4, wherein the communication subsystem of each of the plurality of mapping robots transmits a characteristic signal comprising identifying information corresponding to the transmitting mapping robot.

6. A method for mapping a subsurface comprising:
releasing at least one mapping robot into a subsurface to be mapped;
collecting imaging and scanning data of the subsurface using the mapping robot;
generating geospatial data relating to a position of the at least one mapping robot in the subsurface at the time of the mapping using a subsurface avionics subsystem comprising an inertial navigation system and subsurface positioning system in communication with at least one antenna; and
communicating the mapping data, the timing data, and the geospatial data to a control center located at the surface,
wherein the subsurface avionics subsystem comprises an inertial navigation system and a subsurface positioning navigation system wherein the subsurface positioning navigation system is configured to receive electromagnetic signals from at least one antenna,
wherein the at least one antenna comprises at least first, second and third antennas wherein each of the first, second and third antennas transmit electromagnetic signal pulses in a series of synchronized bursts,
wherein the electromagnetic signal pulses are encoded with identifier information to identify which of the at least first, second and third antennas transmitted the electromagnetic signal pulses, and
wherein the real-time position of the at least one mapping robot is calculated based on information collected from internal sensors of the inertial navigation system and is verified using the distance the at least one mapping robot is from the at least first, second and third antennas wherein the distance is calculated based on the phase difference between successive bursts from the at least first, second and third antennas.

* * * * *